3,462,466
11,17-DIOXYGENATED 4-METHYLESTRA-1,3,5(10)-TRIENES
Leland J. Chinn, Morton Grove, Ill., assignor to G. D. Searle & Co., Chicago, Ill., a corporation of Delaware
No Drawing. Filed Dec. 4, 1967, Ser. No. 696,667
Int. Cl. C07c *169/08, 169/12;* A61k *17/06*
U.S. Cl. 260—397.45                                5 Claims

ABSTRACT OF THE DISCLOSURE

Preparation of the captioned compounds and their valuable and unexpected pharmacological properties, including fertility-inhibiting, anti-hypercholesterolemic, and anti-inflammatory activity, are disclosed.

---

This invention relates to 11,17-dioxygenated 4-methylestra-1,3,5(10)-trienes and processes for the preparation thereof. More particularly, this invention provides new, useful, and unobvious chemical compounds of the formula

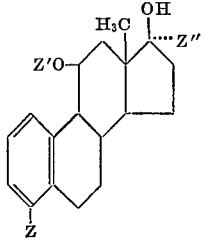

wherein Z represents an alkyl radical, Z' represents hydrogen or an alkanoyl radical, and Z" represents an alkyl, alkenyl, or alkynyl radical.

Among the alkyl radicals represented by Z and Z" lower alkyl radicals are preferred, e.g., methyl, ethyl, propyl, isopropyl, butyl, isobutyl, sec-butyl, tert-butyl, pentyl, neopentyl, hexyl, isohexyl, heptyl, and like saturated, monovalent, acyclic, straight- or branched-chain, hydrocarbon groupings of empirical formula $$-C_nH_{2n+1}$$

wherein $n$ represents a positive integer less than 8. The optimal embodiment of Z is methyl.

The alkanoyl radicals represented by Z' are preferably of lower order also, which those skilled in the art will recognize to be radicals of the formula

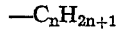

Similarly, the alkenyl and alkynyl radicals represented by Z" are preferably of lower order, and can be thought of as derived from polycarbon lower alkyl radicals by displacement of hydrogen to give rise to double and triple bonds, respectively. Illustrative lower alkenyl radicals are vinyl, allyl, propenyl, isopropenyl, 2-methylallyl, 1-butenyl, 2-butenyl, 3-butenyl, etc., among which vinyl is optimal. Illustrative lower alkynyl radicals are ethynyl, 1-propynyl, 2-propynyl, 1-butynyl, 2-butynyl, 3-butynyl, etc., among which ethynyl is optimal.

The compounds to which this invention relates are useful by reason of their valuable and unexpected pharmacological properties. Thus, for example, they are fertility-inhibiting, anti-hypercholesterolemic, and anti-inflammatory. They are also estrogenic.

The fertility-inhibiting utility of the instant compounds is evident from the results of a standardized test for their capacity to inhibit the fecundity of rats. In this test, which involves substantially the procedure described by Edgren et al. in Fertility and Sterility, 12, 172 (1961), sexually-mature female rats weighing approximately 200 gm. are mated: and each of a group of 5 is subcutaneously injected, daily for 7 days beginning on the first day sperm appears in the vagina, with ≯ 4000 mcg. of compound dissolved or suspended in 0.1 ml. of corn oil or other inert vehicle. Several groups of such animals to which is likewise administered vehicle alone serve as controls. On the 15th ± day after the initial injection, the animals are sacrificed and their uteri inspected for placentation. A compound is considered to be fertility-inhibiting if no normal placentation site (NNPS) is present in more than 50% of the animals treated therewith. Results of testing by this procedure the products of Examples 1A, 1B, 4A, and 4B hereinafter, as also the prior art product, 11β-hydroxy-4-methylestra-1,3,5(10)-trien-17-one (hereinafter referred to as PA), are shown in Table I.

TABLE I

| Product | Dose (mcg.) | Treated rats | | Control rats | | Conclusion |
|---|---|---|---|---|---|---|
| | | No. | NNPS (percent) | No. | NNPS (percent) | |
| 1A | 500 | 5 | 100 | 5 | 20 | Fertility-inhibiting. |
| 1B | 4,000 | 5 | 60 | 5 | 20 | Do. |
| 4A | 200 | 5 | 60 | 5 | 0 | Do. |
| 4B | 500 | 5 | 60 | 5 | 0 | Do. |
| PA | 4,000 | 5 | 20 | 5 | 0 | No sig. response. |

The anti-hypercholesterolemic utility of the instant compounds is evident from the results of a standardized test for their capacity to counteract the increased serum cholesterol induced in rats by ingestion of propylthiouracil. A group of 8 male rats each weighing 220–250 gm. is used for each compound tested, propylthiouracil being administered by maintaining a concentration of 0.02% in the animals' drinking water throughout a 10-day period. Daily during that time, the selected dose of compound is dissolved or suspended in water or aqueous ≯ 30% propylene glycol and administered orally or subcutaneously to each animal. A corresponding group of 8 rats each concurrently and likewise receiving propylthiouracil and water or aqueous ≯ 30% propylene glycol but no compound serves as controls. On the 10th day, the surviving animals are anesthetized; and blood samples are taken from the abdominal aortas and analyzed for cholesterol. A compound is considered anti-hypercholesterolemic if the cholesterol levels in animals treated therewith are significantly ($P<0.05$ as determined by the Wilcoxon Rank Sum method) lower than the corresponding control levels. Results of testing by this procedure the products of Examples 1A and 4B hereinafter, as also the aforesaid prior art compound, are shown in Table II.

TABLE II

| Product | Dose (mg./kg.) | Cholesterol (mg. Percent) | | Conclusion |
|---|---|---|---|---|
| | | Treats | Controls | |
| 1A | 5.1 | 50.1 | 80.2 | Anti-hypercholestero lemic. |
| | | 52.6 | 58.9 | |
| | | 59.5 | 61.9 | |
| | | 50.8 | 70.3 | |
| | | 65.3 | 69.2 | |
| | | 54.5 | 70.3 | |
| | | 56.3 | | |
| | | 64.3 | | |
| 4B | 5.0 | 58.6 | 66.0 | Do. |
| | | 34.4 | 85.6 | |
| | | 40.9 | 66.0 | |
| | | 48.0 | 82.9 | |
| | | 57.5 | 76.0 | |
| | | 36.4 | 86.1 | |
| | | 35.0 | 93.9 | |
| | | 41.8 | | |
| PA | 10.0 | 79.7 | 80.0 | No significant response. |
| | | 68.4 | 72.2 | |
| | | 84.7 | 80.4 | |
| | | 106 | 96.1 | |
| | | 82.5 | 80.4 | |
| | | 102 | 91.5 | |
| | | 71.1 | 79.4 | |
| | | 69.9 | 77.7 | |

The anti-inflammatory utility of the instant compounds is evident from the results of a standardized test for their capacity to inhibit the edema induced in rats by injection of carrageenin. The procedure is a modification of one described by Winter et al., Proc. Soc. Exper. Biol. and Med., 111, 544 (1962). Compound is administered subcutaneously or intragastrically, dissolved or suspended in 0.5 ml. of aqueous 0.86% sodium chloride, propylene glycol, a mixture of these vehicles, or corn oil, to each of 10 male rats weighing 100–130 gm. A like group of rats to which is identically and concurrently administered vehicle alone serves as controls. Precisely 1 hr. later, each animal is injected under the plantar surface of each hind foot with 0.1 ml. of an aqueous 1% solution of carrageenin (Marine Colloids, Inc., Type 402). A compound is considered anti-inflammatory if the average total circumference (T) of the 2 hind feet in the group treated therewith, which is measured in arbitrary units 5 hr. after the carrageenin injection, is significantly ($P \leq 0.05$) less than the corresponding value (C) for the control group. Results of testing by this procedure the products of Examples 1A and 1B hereinafter, as also the aforesaid prior art product (PA) and another prior art product, 4-methyl-estra-1,3,5(10)-triene - 11$\beta$,17$\beta$-diol (hereinafter referred to as P'A'), are shown in Table III.

$Z''MgX$ (wherein $Z''$ is defined as before and X represents bromine or chlorine) to give the corresponding diol of the formula

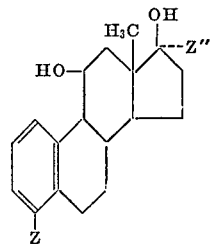

(wherein both Z and Z' are defined as before).

Esterification of the 11-hydroxyl therein to give a corresponding 11-alkanoate hereof is accomplished with pyridine and acetic anhydride or a halide of the formula $Z'X$ (in which Z' and X are defined as before). As an exception to the foregoing procedure, the 11$\beta$-hydroxy and 11$\beta$-alkanoyloxy 17-ethynyl products hereof are prepared by contacting an appropriate 11$\beta$-alkanoyloxy-4-alkylestra-1,3,5(10)-trien-17-one with lithium acetylide-ethylene-diamine complex in tetrahydrofuran solution, acidifying, and separating the resultant mixture of ester and alcohol via chromatography.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practised without departing from the purpose and intent of this disclosure. Throughout the examples hereinafter set forth, temperatures are given in degrees centigrade and relative amounts of materials in parts by weight, except as otherwise noted.

EXAMPLE 1

(A) 11$\beta$-acetoxy-4-methylestra-1,3,5(10)-trien-17-one

A mixture of 57 parts of 11$\beta$-hydroxy-4-methylestra-1,3,5(10)-trien-17-one, 800 parts of acetic anhydride, and 800 parts of pyridine is heated at about 95° for 4 hrs., then poured in 24000 parts of ice-water. The solid thrown down is filtered off, washed with water, dried in air, and crystallized from ether to give 11$\beta$-acetoxy-4-methylestra-1,3,5(10)-trien-17-one melting at 216.5–218.5°.

(B) 4,17$\alpha$-dimethylestra-1,3,5(10)-triene-11$\beta$,17$\beta$-diol

TABLE III

| Product | Dose (mg.) | Route | C | T | C-T | Conclusion |
|---|---|---|---|---|---|---|
| 1A | 25 | Subcut | 102.8 | 98.8 | 4.0 | Anti-inflammatory. |
| 1B | 25 | Subcut | 102.2 | 98.9 | 3.3 | Do. |
| PA | 25 | Subcut | 101.2 | 103.9 | −2.7 | No sig. response. |
| P'A' | 25 | Subcut | 97.7 | 96.6 | 1.1 | Do. |

Those skilled in the art will recognize that observations of activity in standardized tests for particular pharmacological effects as hereinbefore set forth are fundamental to the development of valuable new drug products, both veterinary and human.

Preparation of the compounds of this invention proceeds by esterifying an appropriate 4-alkyl-11$\beta$-hydroxyestra-1,3,5(10)-trien-17-one with pyridine and acetic anhydride to give the corresponding 11$\beta$-acetate which, in turn, is heated in ethereal solution with an appropriate Grignard reagent of the formula To a stirred solution of approximately 143 parts of methylmagnesium bromide in 280 parts of diethyl ether is added a solution of 12 parts of 11$\beta$-acetoxy-4-methylestra-1,3,5(10)-trien-17-one in 135 parts of tetrahydrofuran. The resultant mixture is heated at the boiling point under reflux with stirring for 4 hr., whereupon it is successively chilled in an ice bath and diluted with approximately 1500 parts of water. Sufficient 20% hydrochloric acid is added to induce acidification, and the mixture is then extracted with ether. The ether extract is washed with water, dried over anhydrous sodium sulfate, and concentrated to the point of incipient precipitation by vacuum distillation. The resultant solids are separated and crystallized from diethyl ether to give solvated 4,17α-dimethylestra-1,3,5(10)-triene - 11β,17β - diol which, dried at 100° in vacuo, loses its ether of crystallization and melts at 141.5–143.5°. This product has the formula

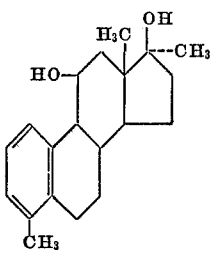

EXAMPLE 2

11β-acetoxy-4,17α-dimethylestra-1,3,5(10)-trien-17β-ol

Approximately 7 parts of 4,17α-dimethylestra-1,3,5(10)-triene-11β,17β-diol is heated at around 90° for 3 hr. with 100 parts pyridine and 100 parts of acetic anhydride. The resultant mixture is poured into 3000 parts of ice-water. The solid which precipitates is filtered off, washed with water, and dried in air. The product thus isolated is 11β-acetoxy-4,17α-dimethylestra-1,3,5(10)-trien-17β-ol, having the formula

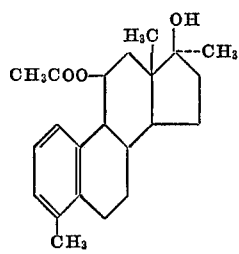

EXAMPLE 3

4-methyl-17α-vinylestra-1,3,5(10)-trien-11β, 17β-diol

To a stirred solution of 15 parts of 11β-acetoxy-4-methylestra-1,3,5(10)-trien-17-one in 180 parts of tetrahydrofuran is added a solution of 17 parts of vinyl magnesium chloride in approximately 90 parts of tatrahydrofuran. The resultant mixture is stirred and heated at the boiling point under reflux for 1¼ hr., at which point 5 parts of methanol is added, stirring sans heat is resumed for 2 minutes, and then a further 26 parts of vinylmagnesium chloride dissolved in 135 parts of tetrahydrofuran is introduced. The mixture thus obtained is stirred at room temperatures for 16 hr. and thereupon diluted with 100 parts of water. Sufficient 20% hydrochloric acid is added to induce acidification, whereupon the mixture is extracted with ether. The extract is washed with water, dried over anhydrous sodium sulfate, and stripped of solvent by vacuum distillation. The residue, a viscous oil, is chromatographed on silica gel, using benzene and ethyl acetate as developing solvents. From an eluate comprising 20% ethyl acetate in benzene, on evaporation of solvent and crystallization of the residue from a mixture of benzene and hexane, 4-methyl-17α-vinylestra-1,3,5(10)-triene-11β,17β-diol melting at 151.5-157.5° is obtained. The product has the formula

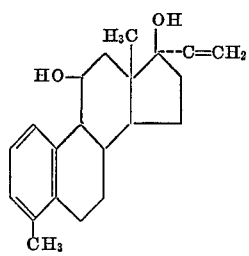

EXAMPLE 4

(A) 11β-acetoxy-17α-ethynyl-4-methylestra-1,3,5(10)-trien-17α-ol

To a solution of 46 parts of 11β-acetoxy-4-methylestra-1,3,5(10)-trien-17-one in 1350 parts of tetrahydrofuran is added 100 parts of lithium acetylide-ethylenediamine complex. Acetylene is passed through this mixture while it is stirred at room temperatures for 16 hr. Approximately 1500 parts of water is then introduced, whereupon stirring at room temperatures is resumed for 1 hr. The resultant mixture is made slightly acidic with 20% hydrochloric acid, at which point it is mixed with approximately 20,000 parts of water. The mixture thus obtained is extracted with chloroform. The chloroform extract is washed with water, dried over anhydrous sodium sulfate, and stripped of solvent by vacuum distillation. The residual oil is chromatographed on silica gel, using benzene and ethyl acetate as developing solvents. From an eluate comprising 5% ethyl acetate in benzene, on evaporation of solvent and crystallization of the residue from a mixture of chloroform and hexane, 11β-acetoxy-17α-ethynyl-4-methylestra-1,3,5(10)-trien-17β-ol melting at 217–219° is obtained. The product has the formula

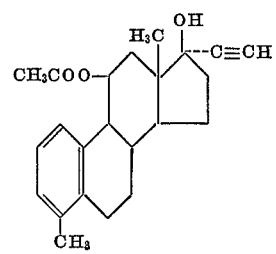

(B) 17α-ethynyl-4-methylestra-1,3,5(10)-triene-11β, 17β-diol

Another eluate eventuating from the procedure described in Example 4A but comprising 10% ethyl acetate in benzene, on evaporation of solvent, affords a residue which, crystallized from ether, melts at 192–195°. The product thus isolated is 17α-ethynyl-4-methylestra-1,3,5(10-triene-11β,17β-diol, having the formula

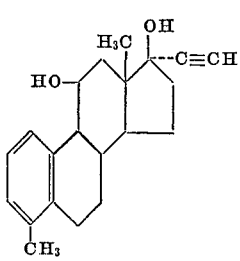

What is claimed is:
1. A compound of the formula

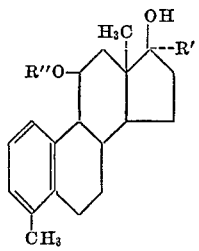

wherein R' represents lower alkyl, vinyl, or ethynyl and R" represents hydrogen or lower alkanoyl.

2. A compound according to claim 1 which is 4,17α-dimethylestra-1,3,5(10)-triene-11β,17β-diol.
3. A compound according to claim 1 which is 4-methyl-17α-vinylestra-1,3,5(10)-triene-11β,17β-diol.
4. A compound according to claim 1 which is 17α-ethynyl-4-methylestra-1,3,5(10)-triene-11β,17β-diol.
5. 11β-acetoxy-4-methylestra-1,3,5(10)-trien-17-one.

References Cited
Caspi et al.: J. Chem. Soc. (1962), pp. 1710–1716.

HENRY A. FRENCH, Primary Examiner

U.S. Cl. X.R.

260—397.5; 424—243